(12) United States Patent
Wang et al.

(10) Patent No.: US 10,394,035 B2
(45) Date of Patent: Aug. 27, 2019

(54) BACKLIGHT MODULE AND TRANSPARENT DISPLAY DEVICE COMPRISING THE SAME

(71) Applicant: BOE TECHNOLOGY GROUP CO., LTD., Beijing (CN)

(72) Inventors: Xin Wang, Beijing (CN); Pan Ni, Beijing (CN); Fan Yang, Beijing (CN); Yan Lu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/556,498

(22) PCT Filed: Feb. 23, 2017

(86) PCT No.: PCT/CN2017/074543
§ 371 (c)(1),
(2) Date: Sep. 7, 2017

(87) PCT Pub. No.: WO2018/010435
PCT Pub. Date: Jan. 18, 2018

(65) Prior Publication Data
US 2018/0239155 A1    Aug. 23, 2018

(30) Foreign Application Priority Data
Jul. 15, 2016    (CN) .......................... 2016 1 0557703

(51) Int. Cl.
F21V 8/00    (2006.01)
G02B 27/10    (2006.01)
G02F 1/1335    (2006.01)

(52) U.S. Cl.
CPC ......... *G02B 27/106* (2013.01); *G02B 6/0063* (2013.01); *G02F 1/133514* (2013.01);
(Continued)

(58) Field of Classification Search
CPC .. G02B 27/106; G02B 6/0023; G02B 6/0015; G02B 6/0046; G02B 6/0063;
(Continued)

(56) References Cited

U.S. PATENT DOCUMENTS 5,528,720 A * 6/1996 Winston .................... F21V 5/02
                                                        385/129
7,123,318 B2 * 10/2006 Nagakubo ............ G02B 6/0055
                                                        349/74
(Continued)

FOREIGN PATENT DOCUMENTS

CN          1499250 A       5/2004
CN          104865731 A     8/2015
(Continued)

OTHER PUBLICATIONS

Office Action received for Chinese Patent Application No. 201610557703.3, dated Oct. 24, 2018, 12 pages (6 pages of English Translation and 6 pages of Office Action).

(Continued)

*Primary Examiner* — Peggy A Neils
(74) *Attorney, Agent, or Firm* — Womble Bond Dickinson (US) LLP

(57) ABSTRACT

The present disclosure relates to a backlight module. The backlight module is configured for use in a transparent display device and comprises: an optical splitter; and a light source arranged at a side of the optical splitter and emitting light towards the optical splitter. The optical splitter is configured to split light emitted from the light source into a first light beam and a second light beam, wherein the first light beam is configured for supplying backlight, and the second light beam is configured for illuminating background behind the optical splitter. The present disclosure also relates to a transparent display device, comprising the above described backlight module; as well as an array substrate (Continued)

and a color film substrate arranged in front of the backlight module.

10 Claims, 2 Drawing Sheets

(52) U.S. Cl.
CPC ...... *G02F 1/133553* (2013.01); *G02B 6/0023* (2013.01); *G02F 1/133615* (2013.01)

(58) Field of Classification Search
CPC ................ G02B 6/0076; G02F 1/1335; G02F 1/133514; G02F 1/133553; G02F 1/133555; G02F 1/133615
See application file for complete search history.

(56) References Cited

U.S. PATENT DOCUMENTS

| | | | | |
|---|---|---|---|---|
| 7,527,411 B2* | 5/2009 | Watanabe | ............ | G02B 6/0038 362/602 |
| 8,496,371 B2* | 7/2013 | Chang | ............ | F21V 7/22 349/65 |
| 8,534,896 B2* | 9/2013 | Boonekamp | ......... | G02B 6/0068 362/607 |
| 8,773,614 B2* | 7/2014 | Han | ............ | G02F 1/1333 349/62 |
| 2004/0100423 A1 | 5/2004 | Nagakubo et al. | | |
| 2006/0238680 A1* | 10/2006 | Park | ............ | G02F 1/1335 349/117 |
| 2010/0271838 A1* | 10/2010 | Yamaguchi | ............ | G02B 6/002 362/602 |
| 2012/0169967 A1* | 7/2012 | Han | ............ | G02F 1/1333 349/62 |
| 2014/0125931 A1* | 5/2014 | Niu | ............ | G02F 1/133514 349/106 |
| 2017/0176813 A1 | 6/2017 | Chen et al. | | |
| 2017/0319726 A1* | 11/2017 | Kim | ............ | A61L 2/10 |
| 2018/0239155 A1 | 8/2018 | Wang et al. | | |

FOREIGN PATENT DOCUMENTS

| | | |
|---|---|---|
| CN | 105627676 A | 6/2016 |
| CN | 106019708 A | 10/2016 |
| CN | 205910466 U | 1/2017 |
| KR | 10-2011-0073725 A | 6/2011 |
| WO | 2016/080385 A1 | 5/2016 |

OTHER PUBLICATIONS

International Search Report and Written Opinion received for PCT Patent Application No. PCT/CN2017/074543, dated May 27, 2017, 15 pages (6 pages of English Translation and 9 pages of Original Document).

* cited by examiner

BACKLIGHT MODULE AND TRANSPARENT DISPLAY DEVICE COMPRISING THE SAME

DECLARATION OF PRIORITY

The present application claims the benefit of priority from the Chinese patent application No. 201610557703.3 filed on Jul. 15, 2016, the disclosure of which is incorporated herein by reference.

FIELD

The present disclosure relates to the field of transparent displays, and in particular to a backlight module and a transparent display device comprising the same.

BACKGROUND ART

With the rapid development of science and technology, it has been proposed to combine existing liquid crystal displays with transparent display so as to provide better experience to the user. With such a transparent liquid crystal display technology, the user can see not only information displayed on a screen but also a background environment behind the screen through the display device. At least by virtue of such transparent display characteristics, transparent liquid crystal display devices are now attracting more and more attention.

In the field of transparent liquid crystal displays, several different implementations have been proposed. Some exemplary solutions comprise a combination of an ordinary liquid crystal display panel and a light guide plate, or comprise a combination of an ordinary liquid crystal display panel and a box. However, such technical solutions still contain many problems, such as poor transparent display effects and absence of thinness and portability for the display device. Thus, the current requirements for the display device cannot be well satisfied. However, these requirements, especially those for thinness and portability of the display device, are right the development trend of electronic devices nowadays.

SUMMARY

In view of above, embodiments of the present disclosure provide a backlight module and a transparent display device comprising the same, for at least partly alleviating or even eliminating one or more of the above indicated disadvantages.

According to a first aspect of the present disclosure, a backlight module is provided. The backlight module is configured for use in transparent display devices, and comprises: an optical splitter; and a light source arranged at a side of the optical splitter and emitting light towards the optical splitter. The optical splitter is specifically configured to split light emitted from the light source into two light beams, i.e. a first light beam and a second light beam. Further, the first light beam is configured for supplying backlight, and the second light beam is configured for illuminating background behind the optical splitter.

In the above backlight module provided by the first aspect of the present disclosure, light emitted from the light source is split into two light beams by an optical splitter, wherein a first light beam is configured for supplying backlight, and a second light beam is configured for illuminating background objects behind the optical splitter. In this case, on one hand, a display device comprising such a backlight module can acquire necessary backlight illumination and thus achieve normal display if being energized; meanwhile on the other hand, with illumination of background behind the optical splitter by the second light beam, ambient environment behind the display device comprising such a backlight module is illuminated, which helps to improve transparent display effects of the display device. Besides, according to the backlight module provided by the first aspect of the present disclosure, the light source is arranged at a side of the optical splitter, which eliminates possible shields of the light source, and further improves the transparent display effects.

According to an embodiment in the first aspect of the present disclosure, the optical splitter comprises a transflective film. In this case, the first light beam comprises light reflected by the transflective film after emission from the light source, and the second light beam comprises light transmitted by the transflective film after emission from the light source. Alternatively, the first light beam comprises light transmitted by the transflective film after being emitted by the light source, and the second light beam comprises light reflected by the transflective film after being emitted by the light source. In the specific embodiment, beam splitting of light emitted from the light source is achieved by a transflective film, wherein the reflected light is used for providing backlight illumination, and the transmitted light is used for illuminating a background environment behind the optical splitter. It should be noted that, the transflective film is commonly known for those skilled in the art, and thus no detailed explanation shall be given for its specific structure, composition and so on. Apparently, as can be easily understood by those skilled in the art, in the backlight module provided by the present disclosure, the optical device is not only limited to the transflective film listed above as an example. In contrast, benefiting from teachings of the present disclosure, those skilled in the art would easily understand that a beam splitting function of the above optical splitter can be implemented by any other optical devices that are available commercially or feasible through search and development in the future.

According to an embodiment in the first aspect of the present disclosure, the backlight module further comprises a transparent substrate, wherein the transflective film is arranged on a front surface or a rear surface of the transparent substrate. With such a transparent substrate, the transflective film can be stabilized, which is beneficial to reliability and stability in mechanics and optics of the proposed backlight module, and also of a transparent display device as well. In other words, one major function of the transparent substrate here is to provide mechanical support. Besides, such a support substrate is also transparent, which will not bring any adverse influences on the transparent display effects of the display device.

According to an embodiment in the first aspect of the present disclosure, the transparent substrate is wedge-shaped, wherein the transflective film is arranged on an oblique surface of the wedge-shaped transparent substrate. In a specific advantageous solution, by designing the transparent substrate to be a wedge-shaped and arranging the transflective film on an oblique surface thereof, a certain angle between the transflective film and light emitted from the light source is ensured. This is beneficial to transmission and reflection of light emitted from the light source, i.e., implementation of the beam splitting function of the optical splitter is facilitated. Apparently, a wedge angle of the wedge-shaped transparent substrate can be selected by those skilled in the art, based on teachings of the present disclosure in combination with specific implementations, which will not be limited here. Besides, by using a wedge-shaped transparent substrate, light emitted from the light source has a longer propagation path. Therefore, local dimness will not occur in the display device, which ensures the quality of display, especially transparent display.

According to an embodiment in the first aspect of the present disclosure, the transparent substrate comprises two sub-substrates superimposed together, and the transflective film is arranged between the two sub-substrates. In a further specific implementation, the number of the transparent substrate may not be limited to one only. When the transparent substrate comprises two superimposed sub-substrates, the function of stabilizing the transflective film can be further enhanced.

According to an embodiment in the first aspect of the present disclosure, the two sub-substrates are both wedge-shaped. The two wedge-shaped sub-substrates are superimposed together with their oblique surfaces facing each other, and the transflective film is arranged between the oblique surfaces of the two wedge-shaped sub-substrates. As mentioned above with respect to the wedge-shaped transparent substrate, by using two wedge-shaped sub-substrates, the propagation path of light emitted from the light source is further lengthened, which facilitates improvement in the display quality.

According to an embodiment in the first aspect of the present disclosure, the transparent substrate is made of a transparent material. Specifically, the transparent material comprises glass or indium tin oxide (ITO). Apparently, having teachings from the present disclosure, those skilled in the art can easily conceive of any other suitable transparent materials. The present disclosure is not only limited to the specific materials as listed above.

According to an embodiment in the first aspect of the present disclosure, the light source comprises a plurality of sub-light sources arranged at two sides of the optical splitter respectively. Optionally, the light source is arranged at a shorter side of the optical splitter. Optionally, the light source comprises a laser diode, an organic light emitting diode or a laser light source. According to such a specific embodiment, the light source can emit light towards the optical splitter from either side, which facilitates uniform distribution in incident positions of light on the optical splitter. In this way, not only brightness and uniformity of the backlight illumination are improved, but also uniform illumination of the background environment behind the display device is facilitated. Besides, when the light source is arranged at a shorter side of the optical splitter, such a uniform illumination effect can be further enhanced.

According to a second aspect of the present disclosure, a transparent display device is provided. The transparent display device comprises: the backlight module according to the first aspect of the present disclosure; and an array substrate and a color filter substrate arranged in front of the backlight module. With such a transparent display device, the transparent display effect is improved. Moreover, as compared with any conventional technical solution using a plurality of coatings, light guide plates and so on, the technical solution provided in the present disclosure only requires one optical splitter, which results in a simpler structure.

According to an embodiment in the second aspect of the present disclosure, the color filter substrate is arranged between the array substrate and the optical splitter of the backlight module. Since a gate metal material in the array substrate has a lower reflective index, the color filter substrate will be brought closer to the optical device by inverting positions of the array substrate and the color filter substrate, which achieves re-utilization of light reflected by the color filter substrate, and improves utilization of light emitted from the light source.

According to an embodiment in the second aspect of the present disclosure, the color filter substrate is coated with a metal reflective film on a surface facing the optical splitter, wherein the metal reflective film at least partly covers a black matrix pattern. In particular, the metal reflective film completely covers the black matrix pattern. In case that a metal reflective film covers the black matrix pattern, light that would otherwise be incident on the black matrix pattern and suffer loss therefor can be reflected towards the optical splitter again by the metal reflective film covering the black matrix pattern, and thus be utilized further. This in turn improves utilization of light emitted from the light source.

According to an embodiment in the second aspect of the present disclosure, the metal reflective film is made of aluminum or silver. Further, the metal reflective film has a thickness of 100-300 nm. In case that a metal reflective film is made of silver, the reflective index will be above 99% when the thickness is 100 nm; the reflective index will be above 98% when the thickness is 200 nm; and the reflective index will be above 97% when the thickness is 300 nm. Apparently, for specific materials and compositions of the metal reflective film as well as possible ranges of thickness, those skilled in the art can easily acquire other feasible equivalent substitutions when having benefits from teachings of the present disclosure.

DETAILED DESCRIPTION OF EMBODIMENTS

A detailed description of one or more embodiments in the present disclosure will be provided as follows with reference to drawings illustrating principles of the present disclosure. Although the present disclosure is described in combination with such specific embodiments, it is not limited to any of them. The scope of the present disclosure is only limited by the accompanying claims, and the present disclosure covers multiple alternative solutions, amendments and equivalent solutions. Multiple specific details will be illustrated in the description below so as to provide a thorough understanding of the present disclosure. These details are only provided for exemplary purposes, and the present disclosure can be carried out according to the claims without some or any of the specific details. For the purpose of clarity, technical materials known in the art of the present disclosure will not be described in detail, so as to avoid blurring the present disclosure with unnecessary details.

The backlight module provided by embodiments of the present disclosure will be described below in detail with reference to the drawings.

Figure 1:
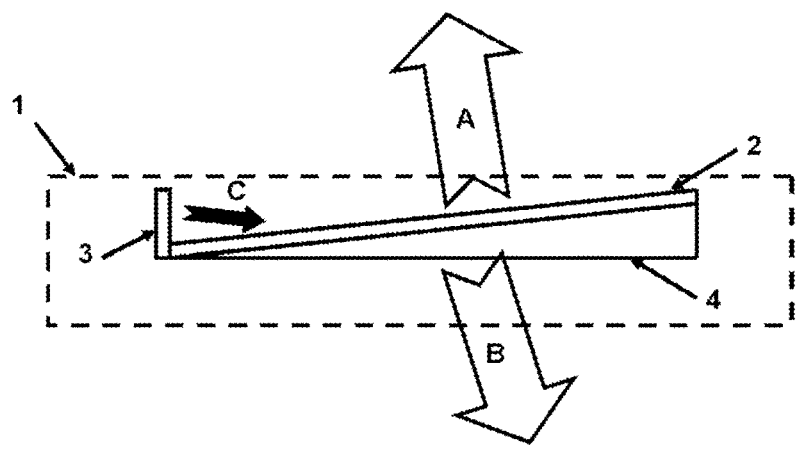
FIG. 1 shows a sectional view of a backlight module according to an embodiment of the present disclosure.

Referring to FIG. 1, a sectional view of a backlight module according to an embodiment of the present disclosure is shown. Such a backlight module 1 can be configured for use in a transparent display device, and comprise: an optical splitter 2; and a light source 3 arranged at a side of the optical splitter 2 and emitting light towards the optical splitter 2. Specifically, in FIG. 1, incident light emitted by the light source 3 towards the optical splitter 2 is indicated schematically by a black solid arrow C. The optical splitter 2 can be configured to split light emitted from the light source 3 into two light beams A and B, wherein a first light beam A is configured for supplying backlight, and a second light beam B is configured for illuminating background behind the optical splitter 2. Specifically, the optical splitter 2 can comprise a transflective film. In this case, the first light beam A can be light reflected by the transflective film after being emitted by the light source 3. Further, the second light beam B can be light transmitted by the transflective film after being emitted by the light source 3, as shown in FIG. 1. Apparently, as can be easily understood by those skilled in the art, when the optical splitter 2 comprises a transflective film, it is also possible that the first light beam A is light transmitted by the transflective film after emission from the light source 3, and the second light beam B is light reflected by the transflective film after emission from the light source 3. This different implementation is not specifically shown here, and can be understood by moving the light source 3 shown in FIG. 1 from a left side of the optical splitter 2 to a right side of it. According to specific embodiments, on one hand, a display device comprising the backlight module can acquire necessary backlight illumination and thus achieve normal display; meanwhile on the other hand, with illumination of background environment behind the optical splitter by the second light beam (i.e., a light beam transmitted/reflected by the transflective film), the background behind the display device will be illuminated, which facilitates the transparent display of the display device.

Referring to FIG. 1, as further shown, the backlight module 1 can also comprise a transparent substrate 4. In this case, the optical splitter 2, specifically the transflective film, can be arranged on a front surface or a rear surface of the transparent substrate 4. In particular, as shown in FIG. 1, the transflective film is arranged on the front surface of the transparent substrate 4. With the help of the mechanical support provided by the transparent substrate 4, reliability and stability in mechanics and optics of the backlight module 1, and furthermore, of a transparent display device comprising such a backlight module 1, are guaranteed.

Referring again to FIG. 1, as further shown, the transparent substrate 4 in the backlight module 1 can be designed in the shape of a wedge. In this case, the transflective film will be provided on an oblique surface of the wedge-shaped transparent substrate 4. As can be clearly seen from FIG. 1, when the transflective film is arranged on the wedge-shaped transparent substrate 4, a certain angle will be enclosed between the transflective film and a light beam C emitted from the light source 3 towards the optical splitter 2 (i.e. a transflective film here). This is beneficial to reflection and refraction of the incident beam C, i.e., the beam splitting by the optical splitter 2. Apparently, as can be easily understood by those skilled in the art, the wedge angle of the wedge-shaped transparent substrate as shown in FIG. 1 is only a schematic representation, which does not mean any limitations to the present disclosure. Besides, with the help of the wedge-shaped transparent substrate and an oblique arrangement of a transflective film obtained therefrom, the incident light beam will be incident on the transflective film more uniformly. In this case, the first light beam for backlight illumination and the second light beam for background illumination will become more uniformly distributed on the entire display device. In this way, uniform display of the display device comprising the above backlight module is ensured, and thus the display quality is improved.

Figure 2:
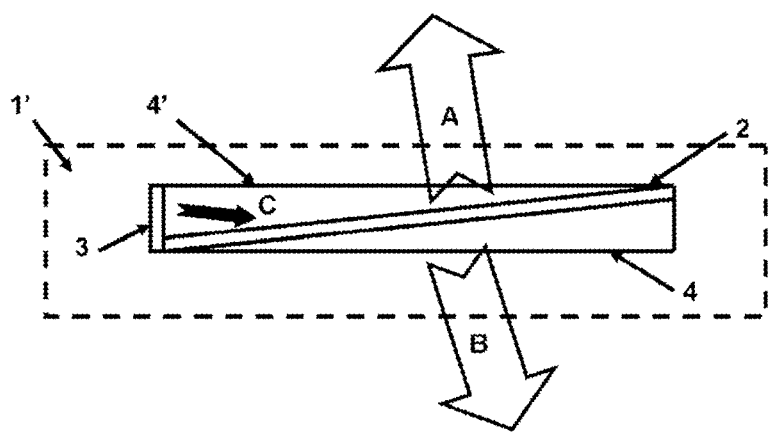
FIG. 2 shows a sectional view of a backlight module according to another embodiment of the present disclosure.

Referring to FIG. 2, a sectional view of a backlight module according to another embodiment of the present disclosure is shown. The backlight module 1' according to this specific embodiment has substantially the same structure as the backlight module 1 shown in FIG. 1. The only difference between them is that in FIG. 2, in addition to the wedge-shaped transparent substrate 4, the backlight module 1' further comprises another wedge-shaped transparent substrate 4'. As shown in FIG. 2, these two wedge-shaped transparent substrates 4 and 4' are arranged oppositely. I.e., their respective oblique surfaces are opposite to each other. In this case, the transflective film is sandwiched between the oblique surfaces of the two wedge-shaped transparent substrates 4 and 4'. With these two wedge-shaped transparent substrates 4 and 4', not only the mechanical stabilization performance of the transflective film is enhanced, but also improvements will be facilitated in the display quality.

Figure 3:
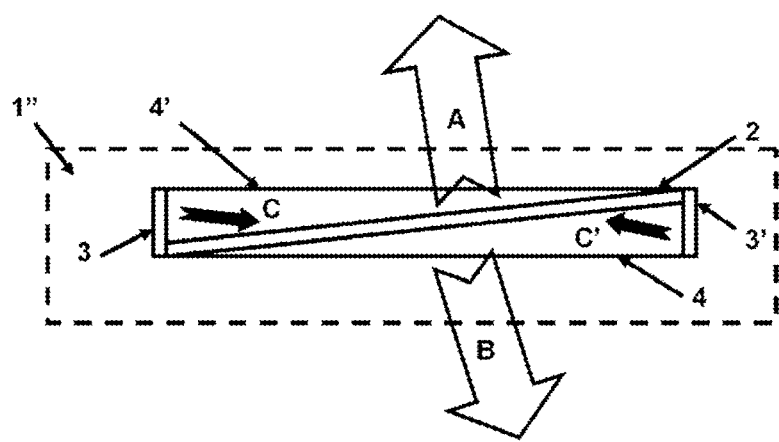
FIG. 3 shows a sectional view of a backlight module according to yet another embodiment of the present disclosure.

With further reference to FIG. 3, a sectional view of a backlight module according to yet another embodiment of the present disclosure is shown. The backlight module 1" according to this specific embodiment has substantially the same structure as the backlight module 1' as shown in FIG. 2. The only difference here is that in FIG. 3, the backlight module 1' also comprise a further light source 3' in addition to the light source 3. Specifically, the light sources 3 and 3' are arranged on two opposite sides of the optical splitter 2 respectively. In this case, for the light source 3' arranged on the right side, after the light beam C' emitted towards the optical splitter 2 (specifically, the transflective film) has been split, the reflected light beam is used for illuminating the background environment, and the transmitted light beam is used for supplying backlight illumination. This is different from the case in which the light source 3 is arranged on the left side. Nevertheless, the light beams C and C' provided by the two light sources 3 and 3' are both emitted towards the optical splitter 2. After beam splitting by the optical splitter 2, a first part of exit light beam provides backlight illumination and a second part of it provides background illumination. Further optionally, the two light sources 3 and 3' are both arranged at a shorter side of the optical splitter 2 (a transflective film here). In this way, the light source can emit light towards the optical splitter 2 from either side, which helps to facilitate uniform distribution of the incident positions of light on the optical splitter 2. By doing this, not only brightness and uniformity of the backlight illumination are improved, but also uniform illumination of the background environment behind the display device is facilitated.

Figure 4:
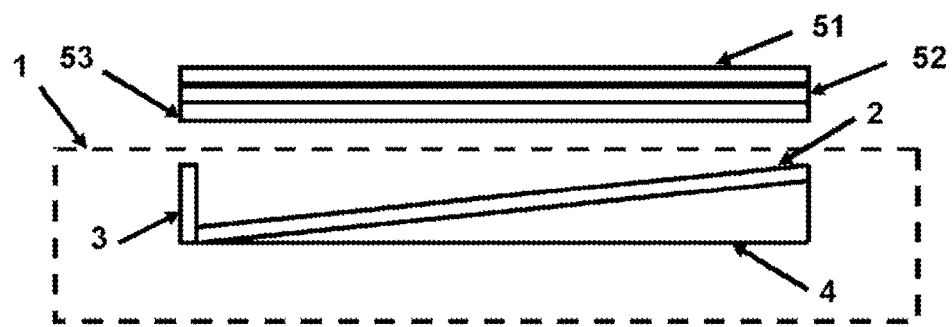
FIG. 4 shows a sectional view of a transparent display device comprising the backlight module according to an embodiment of the present disclosure.

According to a second aspect of the present disclosure, a transparent display device comprising the above described backlight module is provided. FIG. 4 shows a sectional view of an exemplary embodiment of such a transparent display device. As shown in FIG. 4, the transparent display device comprises: the backlight module 1 as described in any of the above embodiments; an array substrate 51 and a color filter substrate 53 arranged in front of the backlight module 1; and an optional liquid crystal panel 52. In the transparent display device comprising the backlight module 1 according to embodiments of the present disclosure, the transparent display effect is notably improved. Moreover, instead of two coating layers coated on an upper side and a lower side of the glass substrate respectively, only a single optical splitter is involved. Thus, the transparent display device according to embodiments of the present disclosure has a simpler structure.

Specifically, with reference to FIG. 4, as compared with the array substrate 51, the color filter substrate 53 is arranged to be closer to the optical splitter 2 of the backlight module 1. Generally speaking, a gate metal material on the array substrate 51 has a lower reflective index. In view of above, according to embodiments of the present disclosure, positions of the array substrate 51 and the color filter substrate 53 are switched. This means that the color filter substrate 53 is disposed between the array substrate 51 and the optical splitter of the backlight module 1. This helps to achieve re-utilization of light reflected by the color filter substrate 53, and improve utilization of light emitted from the light sources 3 and 3'.

Figure 5:
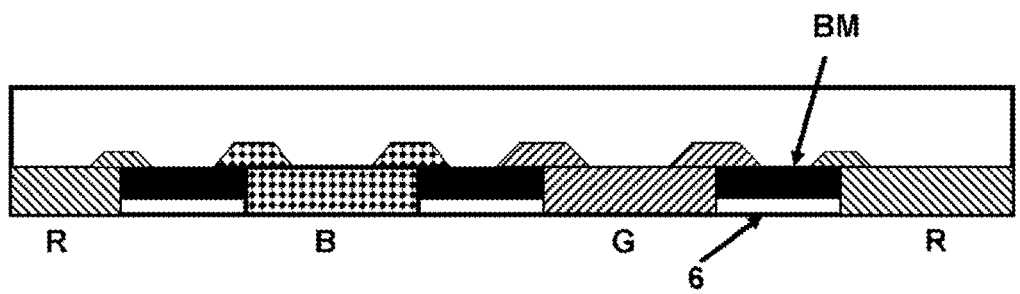
FIG. 5 shows a sectional view of a color filter substrate in the transparent display device according to an embodiment of the present disclosure.

Referring to FIG. 5, a sectional view of a color filter substrate in the transparent display device according to an embodiment of the present disclosure is shown. Specifically, the color filter substrate 53 can be coated with a metal reflective film 6 on a surface facing the optical splitter 2, wherein the metal reflective film at least partly covers a black matrix pattern BM. In particular, the metal reflective film 6 completely covers the black matrix pattern BM. As shown in FIG. 5, a red region (R), a green region (G) and a blue region (B) on the color filter substrate are indicated by right slashes, left slashes and diamonds respectively. Also, the black matrix pattern BM (as indicated by a black solid box in FIG. 5) is arranged at boundaries among the three regions. According to an embodiment of the present disclosure, the black matrix pattern BM is completely covered by the metal reflective film, as indicated by an open box 6 in FIG. 5. In this case, the part of light that would otherwise be incident on the black matrix pattern BM and suffer loss therefor will be reflected by the metal reflective film 6 covering the black matrix pattern BM, and then incident on the optical splitter 2 of the backlight module 1 again, as can be easily seen form a combination of FIG. 4 and FIG. 5. In this way, the part of light that would possibly be wasted is further utilized, which in turn improves the utilization of light emitted from the light source.

Specifically, as can be easily understood by those skilled in the art, the metal reflective film 6 can be made of any suitable metal material, such as aluminum or silver. Furthermore, a thickness of the metal reflective film 6 can be further selected in an optimal manner according to specific implementations, so as to improve the utilization of light from the light source to the maximum. As an example, a thickness of 100-300 nm can be selected for the metal reflective film 6. Apparently, the present disclosure is not limited to such an example only.

It should be pointed out that in describing the present disclosure, directional or positional relationships indicated by terms such as "center", "upper", "lower", "front", "rear", "left", "right", "vertical", "horizontal", "top", "bottom", "inner" and "outer" are directional or positional relationships shown based on the drawings, and they are only used for describing the present disclosure, rather than indicating or implying that the indicated devices or elements must have a particular direction or be constructed or operated in a particular direction. Therefore, all these descriptions cannot be construed as limiting the present disclosure.

Terms such as "first" and "second" are only used for descriptive purposes, and should not be construed as indicating or implying relative importance or hinting at the number of technical features involved. Therefore, features defined by terms such as "first" and "second" may indicate explicitly or implicitly that one or more such features are comprised. In describing the present disclosure, "multiple" means two or more, unless otherwise explained.

In illustrating the description, specific features, structures, materials or characteristics disclosed therein can be combined in any suitable manner in any one or more embodiments or examples.

Although specific embodiments of the present disclosure have been shown and described, it will be obvious for those skilled in the art to make modifications and variations without deviating from the present disclosure in a broader aspect. Therefore, if these modifications and variations fall within the true spirit or scope of the present disclosure, they should all be covered by the appended claims.

The invention claimed is:

1. A backlight module, configured for use in a transparent display device, and comprises:
   an optical splitter; and
   a light source arranged at a side of the optical splitter and emitting light towards the optical splitter, wherein
   the optical splitter is configured to split light emitted from the light source into a first light beam and a second light beam, wherein the first light beam is configured for supplying backlight, and the second light beam is configured for illuminating background behind the optical splitter,
   the optical splitter comprises a transflective film, wherein the first light beam comprises one and the second light beam comprises the other of: light emitted from the light source and then reflected by the transflective film; and light emitted from the light source and then transmitted by the transflective film,
   the backlight module further comprises a transparent substrate, and
   the transparent substrate comprises two sub-substrates that are both wedge-shaped, wherein the two wedge-shaped sub-substrates are superimposed together with their oblique surfaces facing each other, and the transflective film is arranged between the oblique surfaces of the two wedge-shaped sub-substrates.

2. The backlight module according to claim 1, wherein the transparent substrate is made of a transparent material.

3. The backlight module according to claim 2, wherein the transparent material comprises glass or indium tin oxide (ITO).

4. The backlight module according to claim 1, wherein the light source comprises a plurality of sub-light sources arranged at two sides of the optical splitter respectively.

5. The backlight module according to claim 1, wherein the light source is arranged at a shorter side of the optical splitter.

6. A transparent display device, comprising:
   the backlight module according to claim 1; and
   an array substrate and a color filter substrate in front of the backlight module.

7. The transparent display device according to claim 6, wherein
   the color filter substrate is arranged between the array substrate and the optical splitter of the backlight module.

8. The transparent display device according to claim 7, wherein the color filter substrate is coated with a metal reflective film on a surface facing the optical splitter, wherein the metal reflective film at least partly covers a black matrix pattern.

9. The transparent display device according to claim 8, wherein the metal reflective film completely covers the black matrix pattern.

10. The transparent display device according to claim 8, wherein the metal reflective film has a thickness of 100-300 nm.

* * * * *